United States Patent
Keshavaraj

(12) 
(10) Patent No.: US 6,180,204 B1
(45) Date of Patent: Jan. 30, 2001

(54) ONE PIECE AIR BAG

(75) Inventor: Ramesh Keshavaraj, LaGrange, GA (US)

(73) Assignee: Milliken & Company, Spartanburg, SC (US)

( * ) Notice: Under 35 U.S.C. 154(b), the term of this patent shall be extended for 0 days.

(21) Appl. No.: 08/909,796

(22) Filed: Aug. 12, 1997

(51) Int. Cl.$^7$ .................................................... B32B 3/02

(52) U.S. Cl. ........................... 428/81; 428/192; 428/193; 280/728.1; D05/99; 112/475.08

(58) Field of Search .......................... 280/743.1, 728.1, 280/743.2; 428/81, 83, 192, 193; D05/99; 297/228.1, 225; 112/475.08

(56) References Cited

U.S. PATENT DOCUMENTS

| | | | | |
|---|---|---|---|---|
| 5,520,414 | * | 5/1996 | Bishop | 280/743.1 |
| 5,558,951 | * | 9/1996 | Nemoto et al. | 428/102 |
| 5,671,935 | * | 9/1997 | Berger et al. | 280/243.1 |
| 5,836,612 | * | 11/1998 | Lang | 280/743.1 |

* cited by examiner

*Primary Examiner*—Elizabeth M. Cole
(74) *Attorney, Agent, or Firm*—Terry T. Moyer; Earle R. Marden

(57) ABSTRACT

An elongated substantially rectangular nylon 6,6 air bag blank which allows an operator to produce a one piece air bag with four straight seams without undue manipulation during production thereof. The blank has notches in the two upper corners with an elongated notch centrally between the notches in the corners thereof in the long side of the blank.

17 Claims, 4 Drawing Sheets

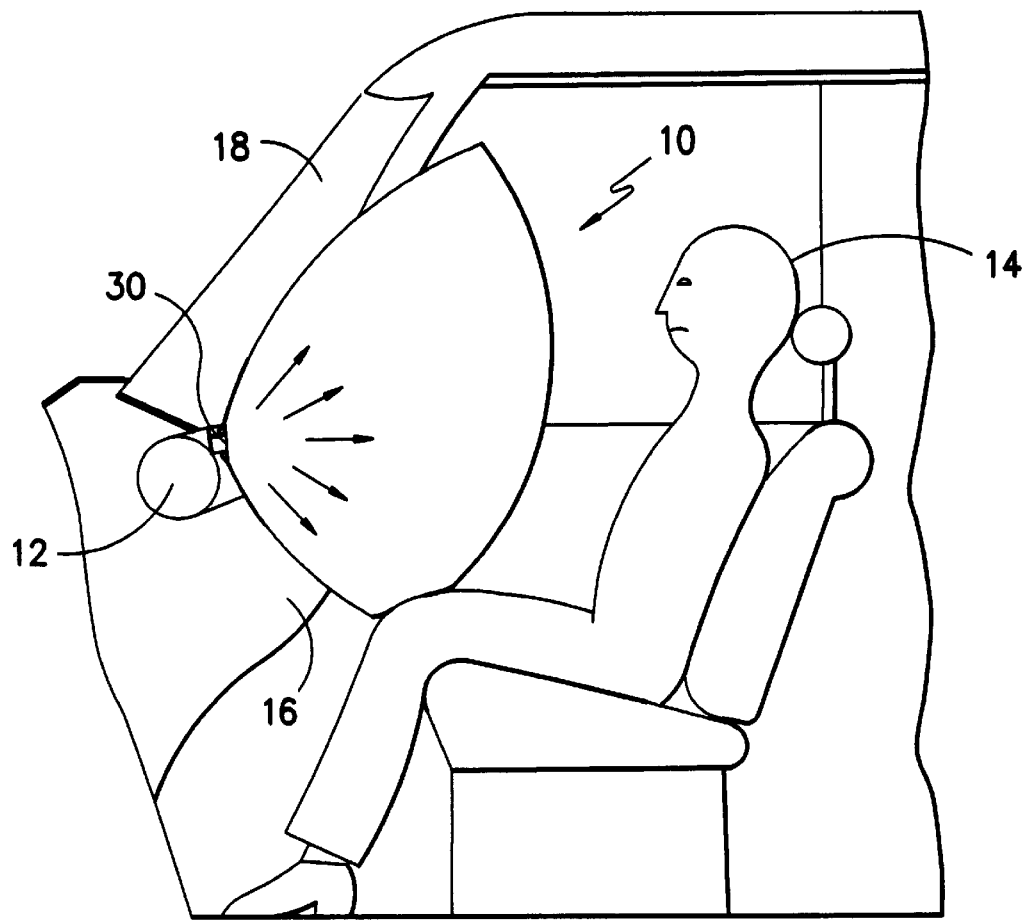
FIG. -1-
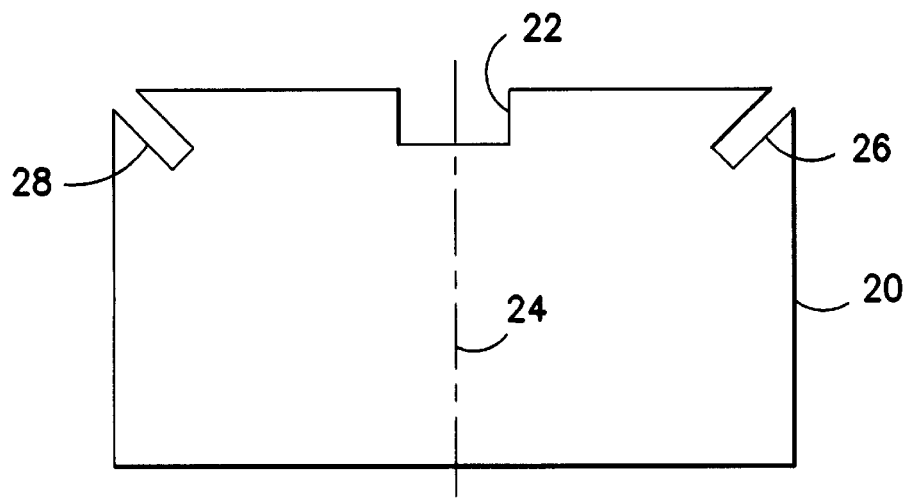
FIG. -2-

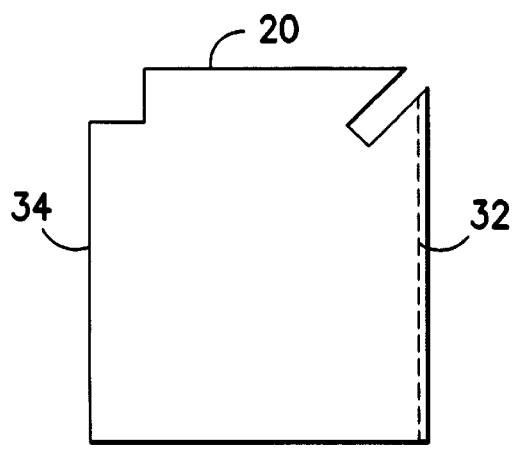
FIG. -3-
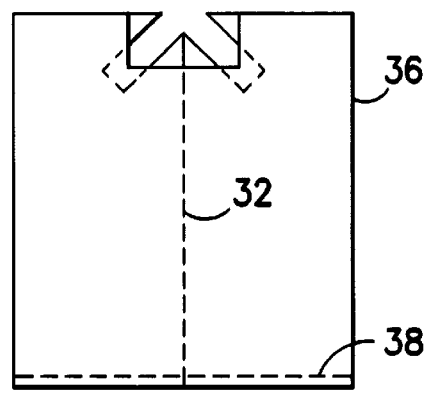
FIG. -4-
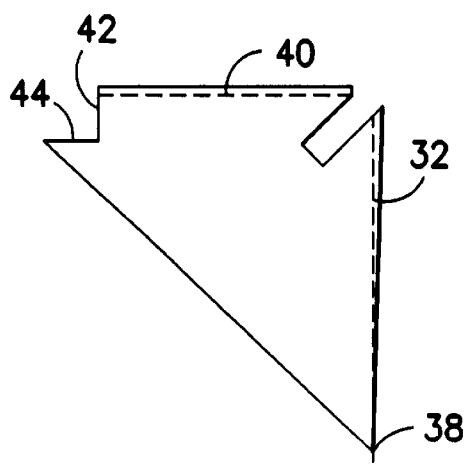
FIG. -5-
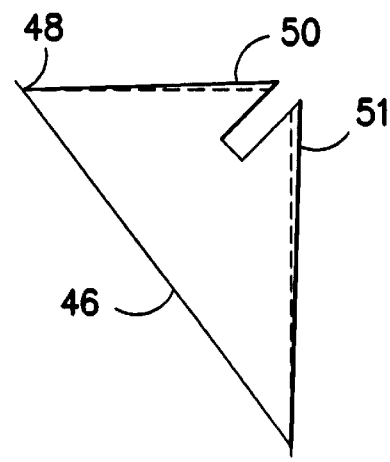
FIG. -6-
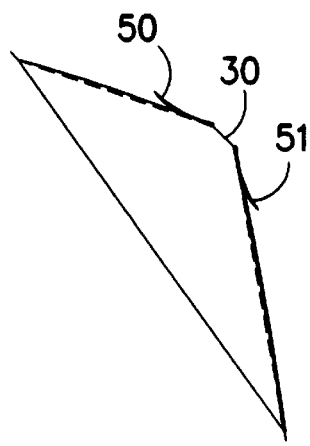
FIG. -7-

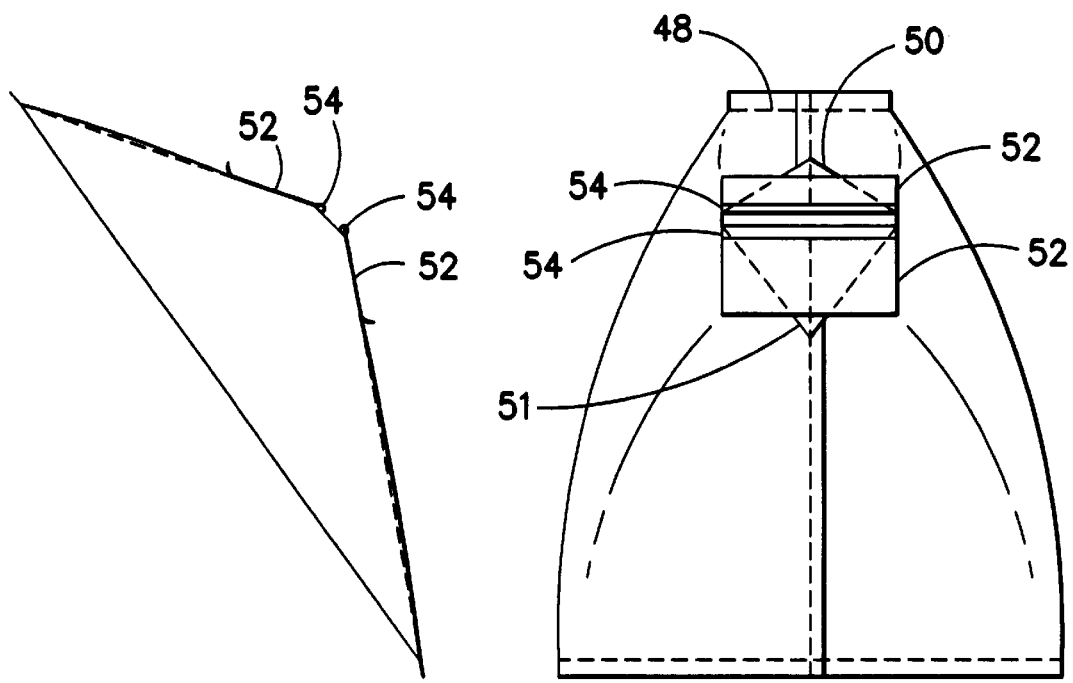
FIG. -8-   FIG. -9-
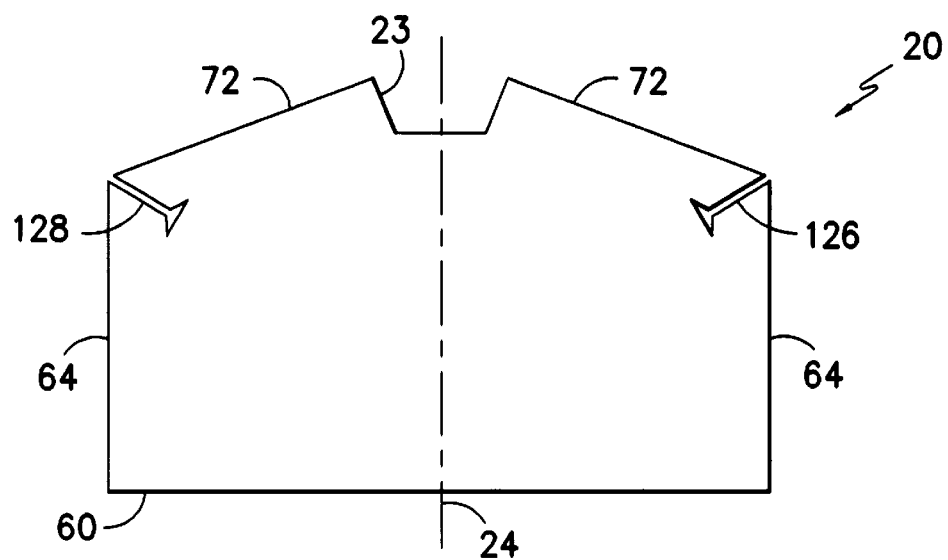
FIG. -10-

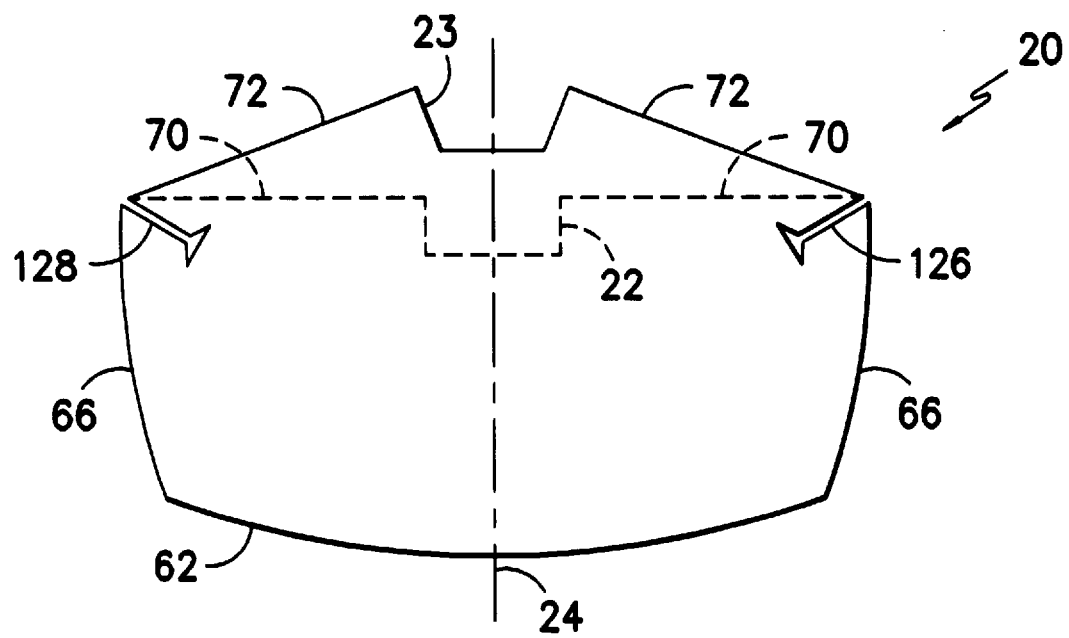
FIG. -11-
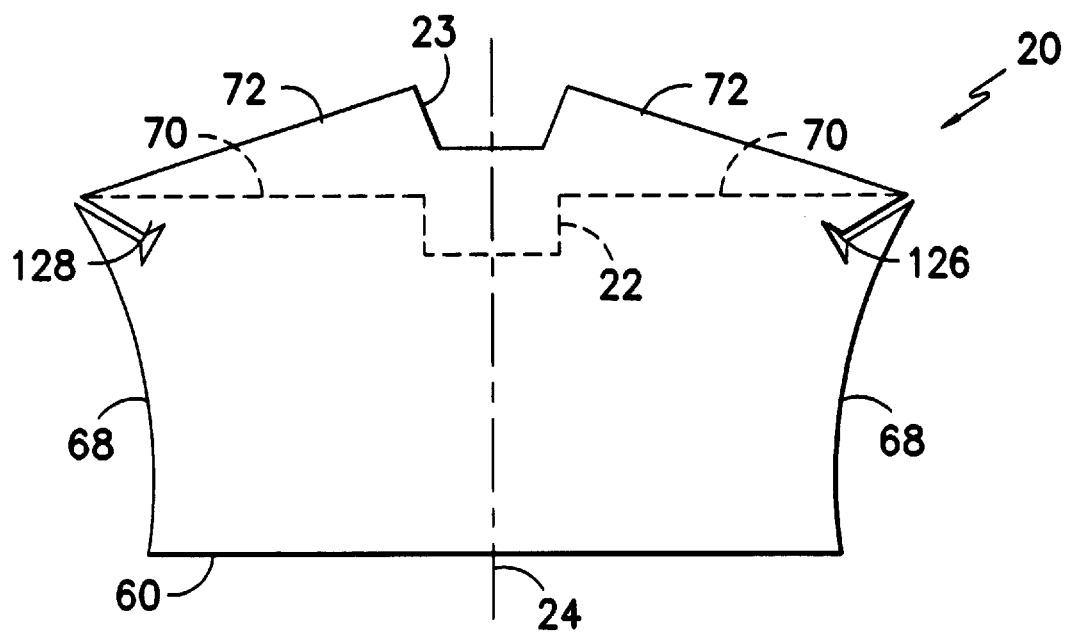
FIG. -12-

ONE PIECE AIR BAG

The present invention relates generally to vehicle occupant restraint cushions and more particularly to a simplified inflatable cushion for use in opposing or side relation to a vehicle occupant. The inflatable cushion is formed from a one piece, elongated, somewhat rectangular panel, the fabrication of which involves only simple straight seams.

An inflatable cushion disposed within a supporting structure such as a dash panel, side door or other fixed portion of a car body in opposing relation to a seat in the vehicle plays an important role in protecting the occupants in a vehicle from injury due to collision against the car body. Typically, the inflatable cushion is inflated rapidly by the pressure of a reaction gas released from an inflator during a collision. This gas generation typically takes place when a gas generating agent in the inflator induces a chemical reaction by a collision signal from a collision detecting sensor when the deceleration of the vehicle exceeds a certain level. The gas which is generated by the generator is then conveyed to the inflatable cushion which expands outwardly as it fills with gas to create a protective barrier between the vehicle occupant and the dash panel or other portion of the vehicle body against which the occupant might otherwise be thrown.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small, well-defined area between the driver and the steering column.

Inflatable cushions for use in the protection of passengers against frontal or side impacts must generally have a more complex configuration since the position of a vehicle passenger may not be well defined and greater distance may exists between the passenger and the surface of the vehicle against which that passenger might be thrown in the event of a collision.

As will be appreciated, a full bodied cushion having a generally hemispherical profile may be desirable so as to provide coverage around a dash panel or door structure. The present invention provides an easily manufactured cushion of substantial depth having such a desired geometry. In order to obtain such configurations in the past, multiple complex sewing steps were necessary to join complex panel structures together. Accordingly, the present invention represents a useful advancement over the present art and illustrated in the following drawings, in which:

FIG. 1 shows a cut-away view of the inflatable cushion of the present invention in deployment between a passenger and a dash panel.

FIG. 2 shows an elevation view of a material blank from which the inflatable cushion illustrated in FIG. 1 may be formed;

FIGS. 3–9 illustrate steps in the formation of an air bag from the blank shown in FIG. 2 and FIGS. 10–12 illustrate modifications of the air bag fabric blank that can be employed within the scope of the invention.

Turning now to the drawings, wherein like elements are denoted by like reference numerals in the various views. In FIG. 1 there is shown an inflatable restraint 10 for use with an inflator 12 to protect a vehicle occupant 14 from impacting against a dash panel 16, windshield 18 or other interior surface in the event of a collision. As will be noted, the configuration of the inflatable restraint or air bag as illustrated is intended to provide sufficient depth of coverage so as to provide a degree of protection to the vehicle occupant 14 in a number of orientations. In particular, the inflatable restraint is configured to have a generally deep arcuate profile so as to provide good overall coverage.

Looking now to FIGS. 3–9, the fabrication of the inflatable restraint 10 or air bag will be explained. As discussed briefly before the air bag 10 is constructed from a single piece of fabric 20 of suitable synthetic material such as polyester, nylon, etc. and initially is in rectangular form rather than circular, elliptical, etc. to provide efficient use of a roll of fabric.

In the preferred form of the invention, the air bag blank 20 shown in FIG. 2 is a plain weave, scoured and heat set nylon 6,6 fabric comprised of a 630 denier multifilament warp and fill yarns with an end count of 41 per inch and a pick count of 41 per inch providing an air permeability of 2.31 CFM/sq. ft. The blank 20 has a rectangular notch 22 cut in one side thereof straddling the centerline 24 and rectangular notches 26 and 28 in opposite corners thereof to form the mouth 30 of the bag 10. Preferably the blank 20 is woven but it is understood that a knit, non-woven, or any expansible blank can be used within the scope of the invention.

The air bag 10 shown in FIG. 1 is formed from the rectangular blank 20, shown in FIG. 2, in the following manner. Initially, the blank 20 is folded on the centerline 24 with the notches 26, 28 overlapping and being sewn in a straight line seam 32 on the side of the overlapped blank 34 adjacent the notches 26 and 28. The blank 34 is then opened in a direction perpendicular to the position shown in FIG. 3 to form the blank 36 and sewn in a straight line seam 38 at the bottom of the blank 36. Then the blank 36 is folded back to the position of FIG. 3 except it forms the shape shown in FIG. 5 since seam 38 has been sewn in. Then an additional straight seam 40 is sewn in so that one side of each side of the notches 26 is sewn to the corresponding side of notches 28. After the seam 40 is sewn, the sides 42 of the notch 22 are flattened against the bottom 44 of the notch 22 to form the air bag shape 46 shown in FIG. 6 and a fourth straight seam 48 (FIG. 9) is sewn in to maintain the sides 42 and the bottom 44 of the notch 22 together. After the seam 48 is sewn, the flaps 50 and 51 are bent over as shown in FIG. 7 to expose the mouth 30.

Then the inflatable restraint or air bag 10 is completed as shown in FIGS. 8 and 9 by inserting rectangular two inserts 52 into the opening 30 by folding them over the long sides of the opening 30 and sewing them into position over the flaps 50 and 51. At the fold point of inserts 52, a rod 54 of suitable rigid material is placed to provide structural integrity to the opening 30 of the air bag 10. Alternately a layer of fabric can be sewn or otherwise secured in the opening 30.

Depending on the particular automobile and/or desired final bag shape, the basic rectangular air bag blank may incorporate some or all of the configurations shown in FIGS. 10–12. In all forms of the invention, the notches in the outward corners of the blank 20 can be rectangular notches 26, 28 as shown in FIGS. 2–9 or elongated notches 126, 128 with a triangular base as shown in FIGS. 10–12.

Other basic air bag blank 20 configurations may be employed either singularly or in combination as shown in variations of FIGS. 10–12. The notch in the top center of the blank 20 can be a rectangular notch 22 or an inverted truncated notch 23. The upper walls of the blank can be slanted as at 72 or substantially flat as at 70 in FIGS. 2–9 as indicated by dotted lines in FIGS. 11 and 12. The bottom edge of the blank 20 can be straight as indicated by reference numeral 60 or curved convexly as indicated by reference numeral 62. The sides of the blank can be straight as indicated at 64, convex as indicated at 66 in FIG. 11 or concave as indicated at 68 in FIG. 12. All of these variations can be intermingled at the manufacturer's option depending on the desired final bag configuration so long as the bag is formed by the disclosed process.

As described herein, a one piece air bag has been developed which is simple in construction, provides maximum utilization of the starting air bag fabric because of its substantially rectangular starting material and only has four straight seams required during manufacture to alleviate complicated manufacturing of the air bag during the production thereof.

Thus, while specific embodiments of the invention have been shown and described, it is to be understood that the invention is not limited thereto, since modifications may certainly be made and other embodiments of the principals of this invention will no doubt occur to those skilled in the art to which this invention pertains. Therefore, it is contemplated by the appended claims to cover any such modifications and other embodiments as incorporate the features of this invention within the true spirit and scope of the following claims.

What is claimed is:

1. A blank for the production of a one piece air bag comprising: a single piece of fabric having two short sides and two long sides, an elongated rectangular notch in one of said long sides of said fabric and notches in the junction of both short sides of said fabric where it meets the long side having the elongated notch therein.

2. The blank of claim 1 wherein said fabric is a plain woven fabric of nylon 6,6 yarn.

3. The blank of claim 2 wherein said yarn is 630 denier.

4. The blank of claim 3 wherein said fabric has approximately 41 picks and ends per inch.

5. The blank of claim 1 wherein said notches at the junction of the short sides are substantially rectangular.

6. The blank of claim 1 wherein said elongated notch is an inverse truncated notch.

7. The blank of claim 1 wherein the bottom of the fabric opposite to said elongated notch is convex.

8. The blank of claim 5 wherein the short sides of said fabric are convex.

9. The blank of claim 5 wherein the short sides of said fabric are concave.

10. The blank of claim 6 wherein the short sides of said fabric are convex.

11. The blank of claim 10 wherein the short sides of said fabric are concave.

12. The method of producing a one piece air bag comprising: the steps of supplying an elongated fabric panel having notches in two of the corners thereof with another elongated notch in the long side of said fabric between said notches in the corners thereof, folding said blank in the middle of said other notch and placing said corner notches over one another, stitching said fabric together on the side of said fabric adjacent said corner notches, opening said blank substantially perpendicular to the folded direction and sewing said blank at the side of said blank diametrically opposite to said other notch, opening said blank to the position as originally folded, sewing the sides of said blank together that is between said corner notches and said other notch, placing the short sides of said other notch against the long side of said other notch, sewing the short sides to the long side of said other notch, folding over the sides of said corner notches to provide an opening in said blank and sewing a stiffening material to at least two sides of said opening to provide structural integrity thereto.

13. The method of claim 12 wherein a stiffening rod is placed in operative relationship with said stiffening material.

14. The method of claim 12 wherein said fabric blank is woven and a layer of fabric is sized in and around said opening.

15. The method of claim 12 wherein said notches in said corners are slit rectangularly.

16. The method of claim 15 wherein a triangular opening is located at the base of said side notches.

17. The method of claim 16 wherein said other notch is an inverse truncated notch.

* * * * *